Figure 1:
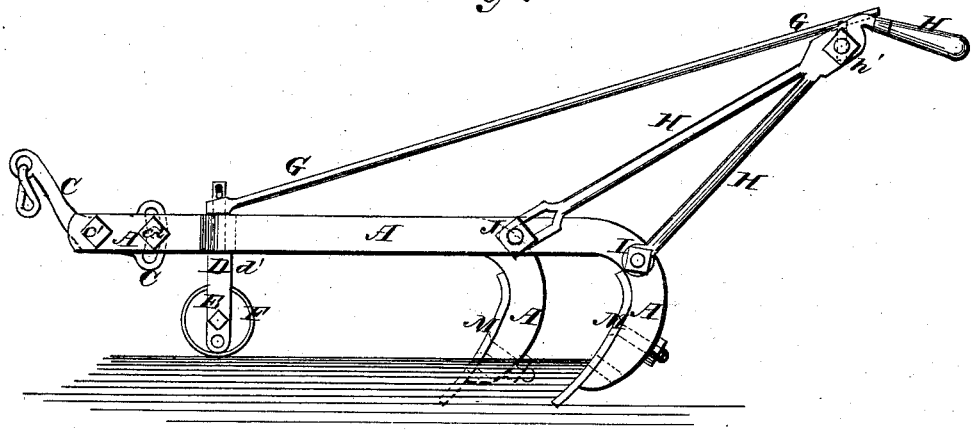
Figure 2:
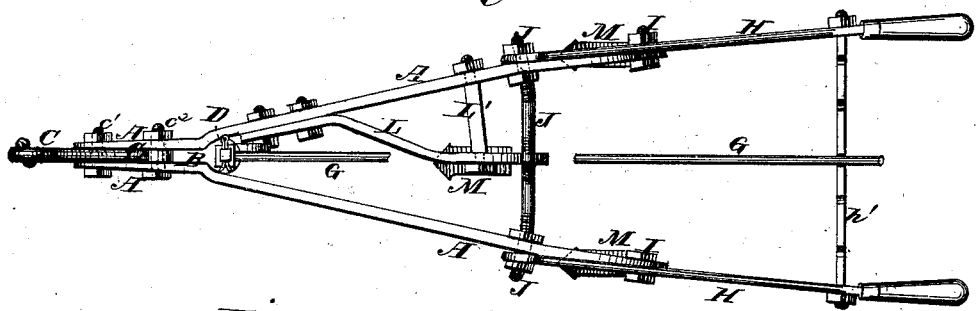
Figure 4:
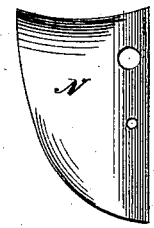
Figure 3:
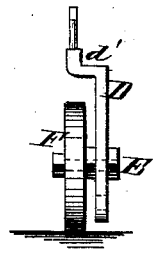

E. NAUMAN.
Cultivator.

No. 166,290. Patented Aug. 3, 1875.

WITNESSES:
Francis McArdle
A. F. Terry

INVENTOR:
Edward Nauman
BY
ATTORNEYS.

United States Patent Office.